(No Model.)

J. HERSHBERGER.
TRACTION ENGINE.

No. 312,633. Patented Feb. 24, 1885.

Witnesses:

Inventor:
Jonathan Hershberger
By W. Burris
Attorney.

UNITED STATES PATENT OFFICE.

JONATHAN HERSHBERGER, OF WALNUT CREEK, OHIO.

TRACTION-ENGINE.

SPECIFICATION forming part of Letters Patent No. 312,633, dated February 24, 1885.

Application filed March 19, 1884. (No model.)

*To all whom it may concern:*

Be it known that I, JONATHAN HERSHBERGER, a citizen of the United States of America, residing at Walnut Creek, in the county of Holmes and State of Ohio, have invented certain new and useful Improvements in Traction-Engines, of which the following is a specification, reference being had therein to the accompanying drawings.

The devices employed heretofore for propelling traction-engines are too numerous and complicated, involving unnecessary cost of manufacture and wear and friction in operation.

My invention consists of such an engine provided with a system of propelling mechanism composed of three gear-wheels only on each side of the boiler, combined with a drive crank-shaft and shifting devices, all constructed and arranged so that the engine may be propelled by either one of the propelling systems, or by both of them combined, as herein fully set forth.

Figure 1:
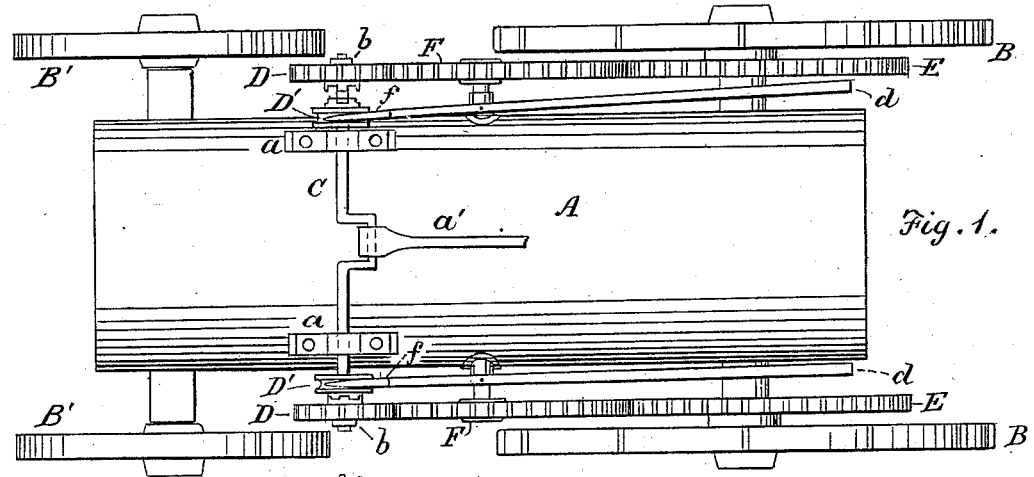
Figure 2:
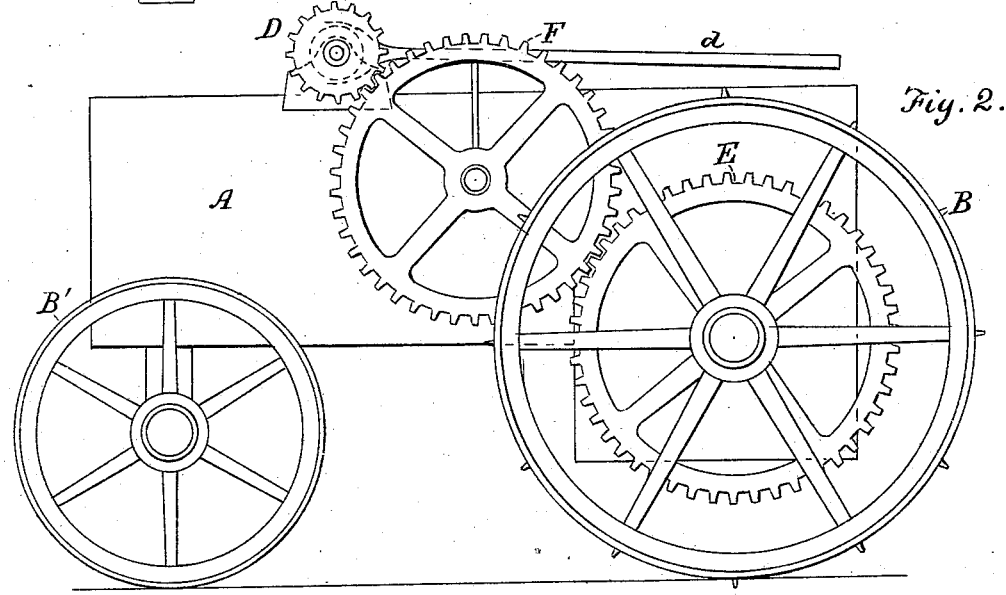
Figure 3:
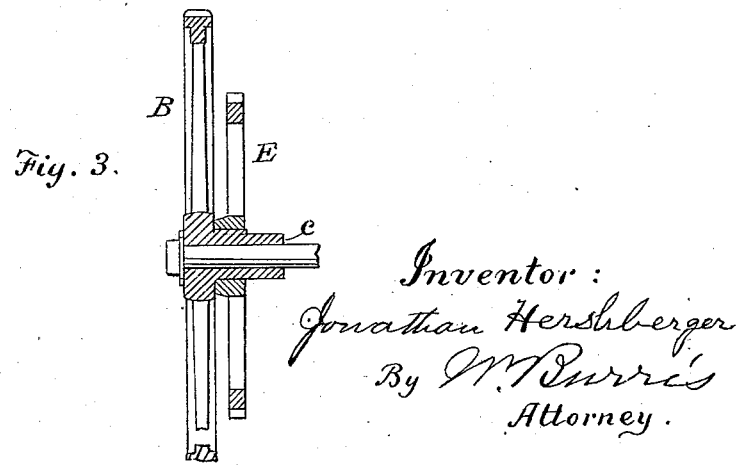

In the accompanying drawings, Figure 1 is a top view of a boiler with my improvements. Fig. 2 is a side elevation. Fig. 3 is a sectional view through the hub of one of the traction-wheels and its driving gear-wheel.

A designates a boiler mounted upon ordinary traction-wheels, B, and front wheels, B'.

C designates a crank-shaft, mounted in bearings $a\,a$, attached upon the boiler. This crank-shaft is connected with a pitman, $a'$, which connects with the piston-rod of an engine-cylinder. (Not shown.)

D D designate small gear-wheels, placed loosely upon the extensions of the crank-shaft C, and are held in place by bearing nuts or shoulders $b$ on the shaft.

D' D' designate small grooved wheels, which are placed loosely upon the shaft C on the inner side of the wheels D D. These grooved wheels are provided with grooves to receive feathers on the shaft. The inner disks of the wheels D and the outer disks of the wheels D' are provided with clutching devices for throwing the gear-wheels, to be described, in and out of gear with the driving-power. This is accomplished by means of pivoted levers $d\,d$, having their ends $f\,f$ bifurcated, the bifurcations being extended above and below the wheels in their grooves, so that these wheels may revolve freely with the shaft, and may be moved endwise on the shaft to and from the wheels D.

E E are gear-wheels mounted on inward extensions of the hubs $c$ of the traction-wheels B.

F F are gear-wheels, of smaller diameter than wheels E, mounted upon axles attached to the side of the boiler in position to gear with the wheels D and the wheels E.

The wheels D' being thrown in gear with the wheels D by means of the pivoted levers, and motion being imparted to the crank-shaft, the wheels D are set in motion, revolving the wheels F, and by them the wheels E are revolved and the traction-wheels are propelled. In making short turns the wheel D which is on the side of the short curve of the turn is thrown out of gear by moving inward its driving-wheel D', which stops the gear-wheels and allows the traction-wheel on that side of the machine to cease revolving until the short curve or turn is accomplished, when the wheels are again thrown in gear.

It will be readily seen that the gearing on each side of my machine is complete in itself, and not dependent upon the gearing of the other side, and hence the machine may be propelled by the single gear of either side in turning the machine, and in case a wheel or any part of the gearing on one side should break, thus avoiding the necessity of stopping the machine when any part of the gearing breaks, as is the case with such engines having only a single system of propelling-gearing.

By my construction and arrangement of the driving-gearing I dispense with several gear-wheels usually employed for the purpose.

I am aware of the patents to Burdett, No. 224,868, February 24, 1880, and to Davidson, No. 188,866, March 27, 1877, showing machines which employ a crank-lever, toggle-arms, and rock-shaft in the shifting devices and several intermediate gear-wheels, a sprocket-wheel, an endless chain, and an internal gear-wheel in the propelling mechanism, which devices I am by my construction, arrangement, and combination enabled to dispense with.

What I claim as new, and desire to secure by Letters Patent, is—

In a traction-engine, the combination, with the crank-shaft C, the grooved wheels C' C', the pinions D D, and the pivoted bifurcated levers $d\ d$, connected directly with the grooved wheels, of the intermediate wheels, F F, and the gear-wheels E E, attached to the traction-wheels of the machine, all constructed and arranged substantially as and for the purposes described.

In testimony whereof I have affixed my signature in presence of two witnesses.

JONATHAN HERSHBERGER.

Witnesses:
    H. A. DANIELS,
    FRANK M. GREEN.